Patented Jan. 26, 1937

2,068,834

UNITED STATES PATENT OFFICE 2,068,834

OXIDIZED "HYDROFORMED SOLVENT"

Carl Winning, Elizabeth, N. J., assignor to Standard Oil Development Company, a corporation of Delaware No Drawing. Application May 10, 1932, Serial No. 610,498

9 Claims. (Cl. 134—56)

This invention relates to a new method for the preparation of improved solvents and more particularly to the preparation of liquid products suitable for use in surface coating compositions to replace aromatic or oxygenated solvents, diluents and drying oils, such as the coal tar solvents, turpentine and the like. These liquid products are prepared by the limited oxidation of "hydroformed solvents" and will be called "oxidized hydroformed solvents" for the purpose of this invention.

In the appended claims the expression "hydroformed solvents" is intended to mean those disclosed in the co-pending application Serial Number 583,703, filed December 29, 1931, by Robert T. Haslam, and described herebelow.

These hydroformed solvents may be produced from hydrocarbon oil distillates such as burning oil and gas oil and in general from hydrocarbon oils of a boiling range including that of gasoline and extending up to about 343° to 371° C. or somewhat higher. In the preferred destructive hydrogenation process these distillate oils are passed in vapor phase with free hydrogen over suitable catalysts at a pressure in excess of 20 atmospheres and preferably 50 to 200 atmospheres or higher and at a temperature above about 482° C. and preferably within the range of about 499° to 565° C. with a suitable partial pressure of hydrogen and time of contact to secure a destructive hydrogenation without the formation of appreciable amounts of polymerized or coky material. The amount of hydrogen supplied is preferably within the range of about 1,000 to 4,000 cubic feet per barrel of feed oil, the amount generally depending upon the gravity and boiling range of the charging stock. A greater proportion of hydrogen may be used with suitable variation in feed rate, temperature and pressure as is known in the art. The feed rate depends upon the reaction temperature, and other operating conditions such as the partial pressure of hydrogen and may be suitably about 1.5 to 4 volumes of oil per volume of catalyst filled reaction space per hour. The catalysts preferably comprise the oxides or sulfides of the metals of Group VI of elements with suitable promoters consisting of the alkaline earth or earth metal oxides. Such catalysts are insensitive to sulfur poisoning and are suitably classified as sulfactive.

The product of such a vapor phase destructive hydrogenation of petroleum distillates and fractions thereof or hydroforming process is called a "hydroformed" naphtha for the purpose of this invention and the claims. It possesses highly desirable solvent properties throughout its boiling range. Fractions of comparative volatility prepared from these hydroformed hydrocarbon distillates may be generally used as solvents wherever aromatic hydrocarbon solvents such as benzene, toluene, xylene, turpentine oils and the like are suitable.

The solvent power of the hydroformed solvents depends not only upon the operating conditions used in the destructive hydrogenation process but also to some extent upon the source of the hydrocarbon oils used as feed stocks. Operating conditions in the destructive hydrogenation process being equal, hydroformed solvents produced from California crudes possess higher solvent power for oxygen-containing compounds, such as pyroxylin or kauri gum, than corresponding solvents from Mid-continent crudes, while solvents from naphthenic base crudes possess even higher solvent power. Recycled stock from cracking of gas oils, especially such oils from asphaltic or naphthenic base crudes, form very desirable feed stocks. Extraction products such as those produced in refining oils with solvents having a selective solvent action for non-paraffinic hydrocarbons, such as phenol or liquid sulfur dioxide, may also be used to advantage as feed stocks for the destructive hydrogenation process, and solvents superior even to pure aromatic hydrocarbons such as toluene and xylene may thereby be produced. Hydroformed solvents prepared by destructive vapor phase hydrogenation under the operating conditions defined above, are far superior to the corresponding straight run or cracked naphthas from the same crudes. In addition to possessing superior solvent power, the hydroformed naphthas are hydrunsulfed, i. e. freed from hydrogen sulfide, during the destructive hydrogenation process and the sulfur content of even high sulfur oils is reduced below that at which bad effects on lead pigments, and the like, are noticed.

It has now been found that if these hydroformed solvents are subjected to a limited oxidation treatment the resulting product possesses improved solvent properties above those shown by the hydroformed solvent used. The solvent power of the oxidized product is increased with respect to the dimethyl sulfate, kauri-butanol and aniline point tests and to the various gums, resins, cellulose plastics and the like used in preparing paints, varnishes and lacquers. In addition the oxidized products may possess desirable drying oil properties comparable to turpentine.

This invention will be fully understood from the following examples:

Example 1

A cracked hydrocarbon distillate of 37.8° A. P. I. and boiling between the approximate limits of 224° and 332° C. is obtained from a Mid-Continent crude. This distillate contains 0.179% sulfur and has an aniline point of 70° C. It is destructively hydrogenated over a sulfactive catalyst at a pressure of 3,000 pounds per square inch and an average catalyst temperature of 510° C. A fraction of the destructively hydrogenated product having an end point of 200° C. is removed from the process and the higher boiling fractions are continuously recycled. The ratio of hydrogen to oil in the feed to the system is 2200 cubic feet of hydrogen per 42-gallon barrel of oil. A portion of the hydroformed solvent thus produced is placed in a glass-lined bomb and held under 110 pounds pressure of air at 100° C. for 48 hours. A description of the hydroformed solvent and the oxidized product is given in the table below.

Since in the oxidation process some oxygenated products are formed which have somewhat higher boiling points than the original hydroformed solvent, it may be desirable for certain solvent purposes to remove the higher boiling fractions from the product. This is illustrated in the following example.

Example 2

The oxygenated product from Example 1 was distilled and the fraction having the same end point (about 198° C.) as the original hydroformed solvent was separately collected. The solvent properties of this fraction are presented in the table below.

Oxygenated products of a desired volatility and boiling range may also be obtained by choosing a suitable hydroformed solvent fraction of somewhat lower final boiling point, as indicated in the following example.

Example 3

A fraction of the hydroformed solvent boiling between the approximate limits of 77° and 149° C. was subjected to the oxidation conditions described in Example 1. The resulting oxidized product boiled between the approximate limits of 65° and 199° C. The solvent power of the feed stock and product of this experiment are also shown in the table below:

Solvent power of hydroformed solvents before and after oxidation

| Exp't No. | Sample | Dimethyl sulfate value | Kauri-butanol value |
|---|---|---|---|
|  | Average petroleum solvent naphtha | 8 | 35 |
| 1 | Original hydroformed solvent | 16 | 43.4 |
|  | Oxidized product | 28.5 | 59.4 |
| 2 | Oxidized product from Exp. 1, cut to same end point as the original hydroformed solvent | 20.0 | 48.7 |
| 3 | Fraction of hydroformed solvent (Exp. 1) boiling approximately between 77°–149° C. (A. S. T. M. naphtha distillation) | 13.0 | 40.0 |
|  | Oxidized product (approximate boiling range 65°–199° C.) from same fraction | 25.0 | 54.3 |

It is readily seen from the above examples that the solvent power of petroleum naphthas already greatly increased by hydroformation may be even further increased by oxidation under suitable conditions.

The oxidation process is preferably conducted at low temperatures insufficient to cause appreciable decomposition and/or polymerization of the hydroformed solvent or the oxidized products. The reaction temperature depends on other conditions attending the oxidation such as the pressure, oxygen concentration, time and method of contact, activity of catalysts, if used, and other conditions. Especially desirable products are obtained at temperatures below about 300° C. and temperatures below 150 or even 100° C. may be used with suitably increased time of contact. Free oxygen may be used as the oxidant but an oxidizing gas containing nitrogen or other inert diluents is preferred. Reaction pressures of about 50 to 200 pounds per square inch are desirable although higher pressures up to 100 to 300 atmospheres or more may be used, especially in the lower reaction temperature range between about 20 and 120° C. The reaction is preferably conducted under suitable conditions of temperature and pressure so that at least a portion of the hydroformed solvent is in liquid phase. The oxidation may be conducted as either a batch or a continuous process or an oxidizing gas may be passed through a body of liquid hydroformed solvent maintained at suitable reaction conditions. Although catalysts are not necessary, their presence is desirable in order to shorten the time required for the oxidation. This may be accomplished by the addition of oxidation accelerators, among which may be mentioned copper, cobalt, lead, manganese and their salts. Anti-acids may also be used to advantage. These are basic substances such as metallic oxides or hydroxides or other basic compounds capable of forming salts stable under the operating conditions with acidic products formed in the oxidation process. Calcium hydroxide or oxide is an especially desirable anti-acid.

The product obtained upon oxidation of the hydroformed solvent is normally satisfactory as regards color and odor and requires no further refining. The oxidized hydroformed solvent possesses improved solvent characteristics throughout its boiling range. Fractions of any desired volatility may be prepared either by selecting as an oxidation feed stock a hydroformed solvent cut of suitable boiling range or by distillation of the oxidized product. The oxidized product if not distilled contains oxidation products which form resins during the drying of the solvent and contribute to the strength of the film in surface coating compositions in which they may be employed. The oxidized hydroformed solvents, particularly prior to distillation, may therefore be likened to and used in substitution for turpentine and other drying oils.

Fractions of substantially any desired boiling range may be prepared according to the above described methods and may be used in various surface coating compositions according to the volatility requirements of such compositions as may be readily determined by one skilled in the art. The oxidized products are also suitable for use as rubber solvents and for many other solvent purposes. They also possess superior antidetonating characteristics rendering them valuable for use as motor fuels. Among the fractions which may be prepared for use in surface coating compositions and for other purposes may be mentioned those of the following approximate boiling ranges: 60° to 105° C., 77° to 121° C., 88° to 138° C., 138° to 188° C., 149° to 171° C., 171° to 215° C., and others. These fractions are generally characterized by dimethyl sulfate values above 20 or 40 and kauri butanol values of 40 to 175 or even higher.

The oxidized hydroformed solvents may be used generally in vehicles for resins, varnish gums and nitrocellulose in varnish, lacquer and paint formulae wherever benzine, toluene, xylene, turpentine and the like are suitable, and they may be substituted either partially or entirely for such hydrocarbons. These solvents may accordingly be used in varnish preparations generally, in admixture with other suitable solvents for the gums and resins customarily used. They may also be used in lacquer preparations in admixture with lacquer vehicles generally, such as those containing aliphatic alcohols, ketones, and fatty acid esters and are especially desirable when used with secondary amyl, secondary butyl and isopropyl alcohols and their acetic esters. Pyroxlin and the other cellulose plastics, plasticizers, gums and resins, such as the phthalic acid glyceride resins, dammar gums and others commonly known to the lacquer industry may be used with these vehicles in making lacquer compositions. These solvents may also be used in homogeneous vehicles containing drying oils suitable for admixture with pigments for the preparation of paint. They are also suitable for use in the preparation of quick drying enamels, such as those containing synthetic resins.

This invention is not to be confused with previously described methods for producing oxidized products by the limited oxidation of ordinary petroleum naphthas, that is naphthas not produced by the hydroforming process, since such naphthas are either very resistant to oxidation or else yield gummy discolored malodorous products on oxidation. For this reason it has heretofore been considered desirable to render the oxidation stock as highly parafinic as possible prior to its oxidation. This has been accomplished by suitable refining methods, such as acid treating, to remove aromatic and olefinic compounds or by hydrogenation at low temperatures and pressures with a process similar to that used for hardening fats by which the undesirable compounds are saturated with hydrogen. Both of these refining processes render the naphtha suitable for oxidation only at the expense of a decrease in its solvent power. The oxidation of such refined naphthas is very difficult, and products inferior in solvent power to my improved products are secured. On the other hand, the hydroforming process provides highly suitable oxidation stocks which possess greatly improved solvent characteristics over the original naphthas and render the oxidized product of still greater value as a solvent.

This invention is not to be limited to any examples which are given herein solely for purpose of illustration nor to any theory regarding the solvent characteristics of these improved products but only to the following claims in which I wish to claim all novelty insofar as the prior art permits.

I claim:

1. The process of preparing solvents which comprises subjecting a "hydroformed solvent" prepared by destructive hydrogenation of hydrocarbon oils of a boiling range including that of gasoline and extending up to 370° C. to limited oxidation at a temperature below about 300° C. and at a pressure above about 50 pounds per square inch.

2. Process according to claim 1, in which the oxidation is effected at a temperature below about 150° C.

3. Process according to claim 1, in which the "hydroformed solvent" to be oxidized is prepared by destructive hydrogenation of liquid hydrocarbon extracts obtained by treating oils with solvents having a selective solvent action for non-paraffinic hydrocarbons.

4. Process according to claim 1 in which an oxidized "hydroformed solvent" boiling below about 232° C. is secured by distillation of the product of the limited oxidation treatment.

5. Process according to claim 1 in which an oxidized "hydroformed solvent" boiling substantially below about 232° C. and possessing drying oil properties is secured by subjecting a "hydroformed solvent" boiling below about 230° C. to the limited oxidation treatment and subsequent distillation.

6. Process according to claim 1 in which the oxidation is conducted with air and with a "hydroformed solvent" substantially in liquid phase.

7. Process according to claim 1 in which the limited oxidation is conducted with air at a pressure above about 200 pounds per square inch and at a temperature below about 120° C.

8. Process according to claim 1 in which the limited oxidation is conducted with the "hydroformed solvent" substantially in liquid phase with air at a pressure above about 50 pounds per square inch and at a reaction temperature below about 150° C.

9. An oxygen-containing organic solvent derived from a "hydroformed solvent" having a kauri butanol solvent value substantially above 40 and a dimethyl sulfate value above 20.

CARL WINNING.